United States Patent [19]

Specht

[11] Patent Number: 4,964,237
[45] Date of Patent: Oct. 23, 1990

[54] BOUQUET ASSEMBLY DEVICE

[76] Inventor: Lahna J. Specht, 17750 Fruitport Rd, Spring Lake, Mich. 49456

[21] Appl. No.: 216,822

[22] Filed: Jul. 8, 1988

[51] Int. Cl.⁵ .............................................. A01G 5/00
[52] U.S. Cl. .................................................. 47/41.01
[58] Field of Search ................. 47/41 R, 41.11, 41.12, 47/41.13, 45; 211/60.1, 181, 119.03, 69.1, 69.9, 119; 248/27.8; 209/400, 401, 402, 409

[56] References Cited

U.S. PATENT DOCUMENTS

| | | | |
|---|---|---|---|
| 126,499 | 5/1872 | Streeter | 211/181 X |
| 191,331 | 5/1877 | Forman | 211/69.9 |
| 460,445 | 9/1891 | Nessler | 211/60.1 |
| 536,908 | 4/1895 | Bailey | 47/41 R X |
| 845,669 | 2/1907 | Thayer | 211/181 X |
| 871,571 | 11/1907 | Delany | 209/409 |
| 1,055,914 | 3/1913 | Hus | 47/45 |
| 1,062,242 | 5/1913 | Klug | 211/181 X |
| 1,260,042 | 3/1918 | Pullman | 47/41 U X |
| 1,487,909 | 3/1924 | Andrews | 211/181 X |
| 1,629,112 | 5/1927 | MacDonald | |
| 1,739,462 | 12/1929 | Hunt et al. | 47/41.11 |
| 1,743,987 | 1/1930 | Tinaglia | 47/39 |
| 1,775,203 | 9/1930 | Krumholz | |
| 2,030,249 | 2/1936 | Goldberg | 47/44 |
| 2,150,550 | 3/1939 | Keller | 41/12 |
| 2,193,727 | 3/1940 | Jouffray | 120/108 |
| 2,261,326 | 11/1941 | Atkisson et al. | 47/41.11 X |
| 2,491,827 | 12/1949 | Morello | 311/80 |
| 2,553,103 | 5/1951 | Miller | 248/27.8 |
| 2,818,681 | 1/1958 | Coplen | 47/34 |
| 3,058,706 | 10/1962 | Snell | 248/27.8 |
| 3,447,262 | 6/1969 | Uhl | 47/41.11 |
| 3,457,673 | 7/1969 | Shupe et al. | 47/41.12 |

FOREIGN PATENT DOCUMENTS 24447 of 1909 United Kingdom ....... 209/410 U X

Primary Examiner—Robert A. Hafer
Assistant Examiner—S. Kimell
Attorney, Agent, or Firm—Price, Heneveld, Cooper, DeWitt & Litton

[57] ABSTRACT

A device for assembling elaborate bouquets including a workholder and support means for supporting the workholder in a cantilever fashion. The workholder includes a platform having an aperture therein and a plurality of flexible lines held taut across the aperture in a grid pattern by retention means. A bouquet is assembled by inserting the stems of greens and flowers in the grid openings in the aperture with the stems extending either toward a base or to a vase position above the base. After the flowers and greens are arranged, the stems are gathered and the lines are dislodged from the gripping means and removed from their position between the stems of the flowers and greens.

13 Claims, 2 Drawing Sheets

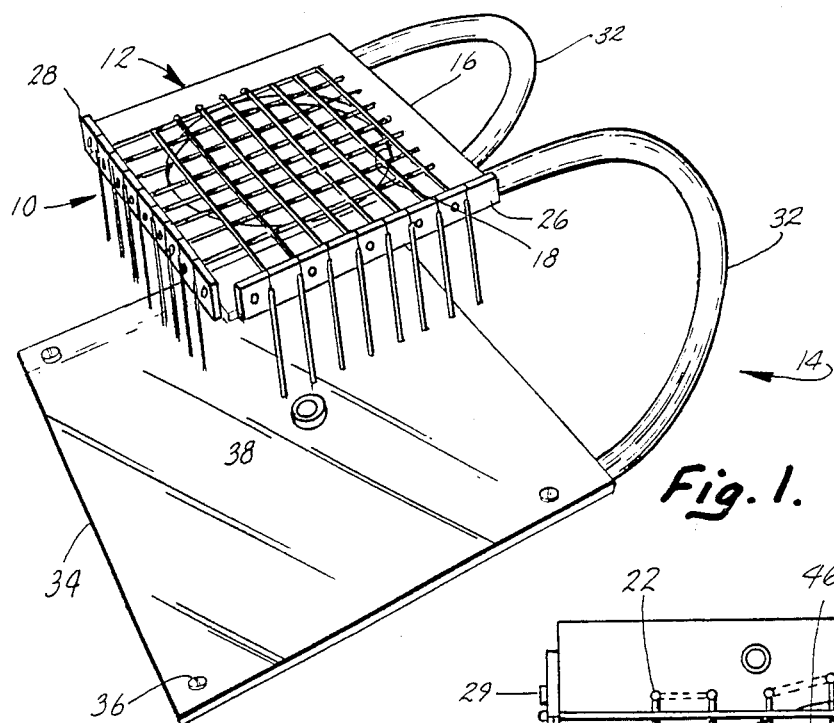
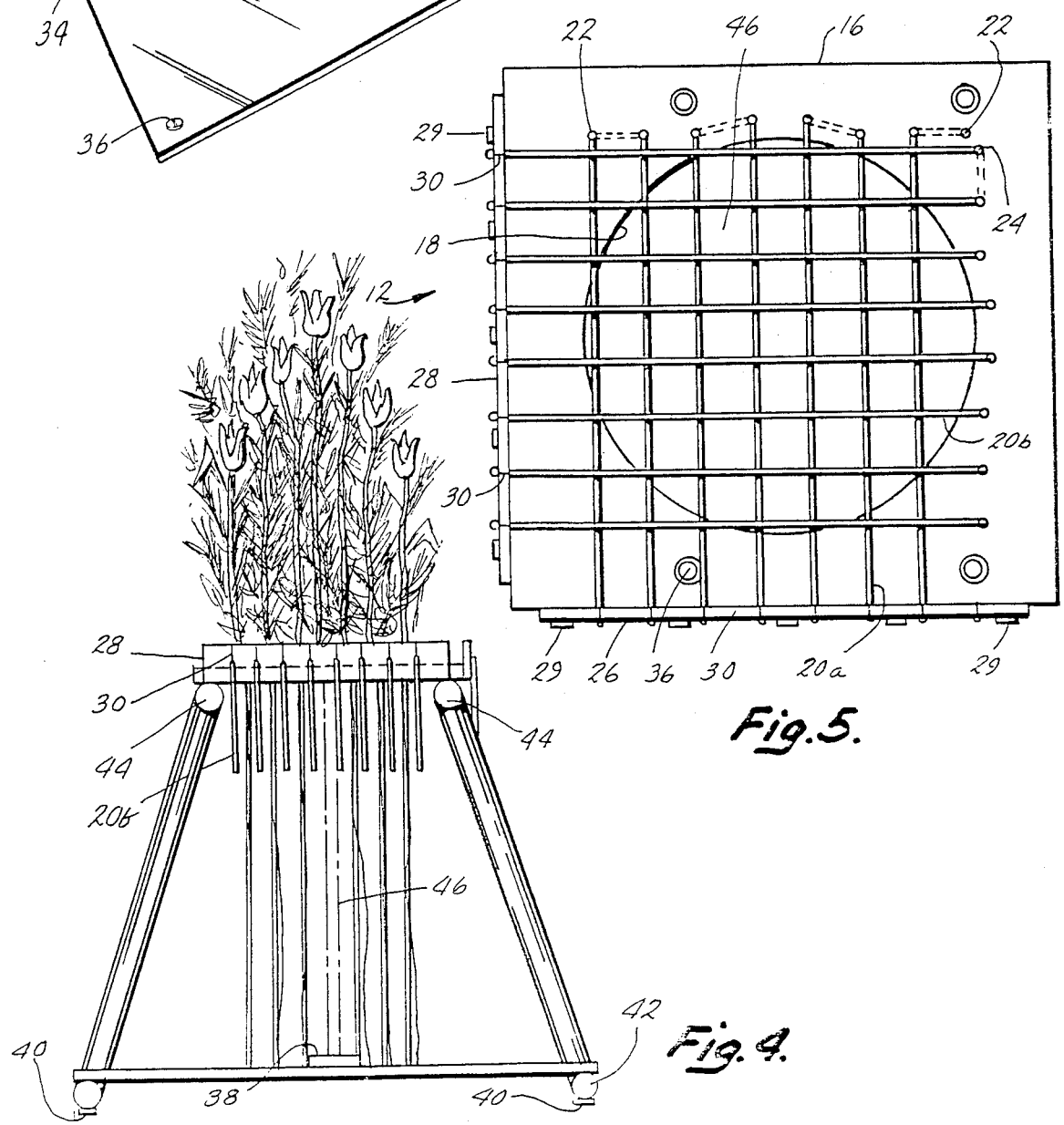

BOUQUET ASSEMBLY DEVICE

BACKGROUND OF THE INVENTION

This invention relates to a device for assembling floral bouquets, particularly high fashion hand-tied bouquets.

Hand-tied bouquets are traditionally assembled by a professional designer who holds the developing bouquet in one hand and adds greens and flowers to the bouquet with the other hand. When the bouquet is complete, the stems of the greens and flowers are wrapped with a tie. The skills and dexterity necessary to assemble bouquets in this fashion take years to develop. For high fashion bouquets, which are large and utilize a wide array of different types of flowers and greens, the dexterity requirement exceeds all but the most talented designers. Furthermore, once a designer begins assembling a bouquet, the task must be completed without interruption because the developing bouquet may not be set down for later resumption of assembly.

Some of the difficulties in assembling a bouquet are overcome by arranging the bouquet in a vase or like container. The designer may insert greens and flowers at a desired pace and may be interrupted during assembly. Further, the dexterity requirements are substantially lessened because the developing bouquet is not held in the designer's hand.

The primary drawback of the container-assembled bouquet over the hand-assembled bouquet is one of longevity. The hand-assembled bouquet may be periodically removed from a container in order to snip the ends of the stems to enhance water absorption to the greens and flowers. In contrast, once the container-assembled bouquet is complete, the greens and flowers cannot easily be removed from the vase to snip the stem ends without requiring complete reassembly of the bouquet.

SUMMARY OF THE INVENTION

The present invention overcomes the difficulties of the prior art by providing a bouquet assembly device having a platform with a large central aperture defining a workholder, support means for supporting the workholder above a horizontal surface and retaining means for removably retaining a plurality of lines in tension across the aperture in a grid pattern. A bouquet may be assembled according to the invention by inserting stems of greens and flowers traversing the aperture in the grid openings defined by the lines, gathering the stems together and removing the lines from their position between the stems.

The grid defined by the lines retain the greens and flowers in the position in which they are inserted into the aperture. Thus, the designer may be interrupted and return to the process. Because the bouquet may be assembled in a holder, not in the designer's hand, the requirement for manual dexterity is substantially eliminated and more complex bouquets may be assembled. The bouquets assembled by the device and method of the invention are "balanced" in that their stems are orderly and closely gathered with the ends of the stems so even that a bouquet may actually stand alone on the ends of its stems. Thus, the bouquet is readily removable from a vase in order to periodically snip the ends of the stems to enhance water absorption and thus longevity.

Many of the advantages of the present invention may be obtained by assembling a bouquet directly into a vase positioned under the platform aperture. The flowers and greens will be supported by the lines, not the vase, so a superior arrangement may be obtained.

These and other related objects, advantages and features of this invention will become apparent upon review of the following specification in conjunction with the drawings.

BRIEF DESCRIPTION OF THE DRAWINGS

FIG. 1 is a perspective view taken from the top and right front of a device according to the invention;

FIG. 4 is a front elevational view taken along the lines IV—IV in FIG. 2; and

FIG. 5 is an enlarged plan view of the work platform portion of a device according to the invention.

DESCRIPTION OF THE PREFERRED EMBODIMENT

Figure 3:
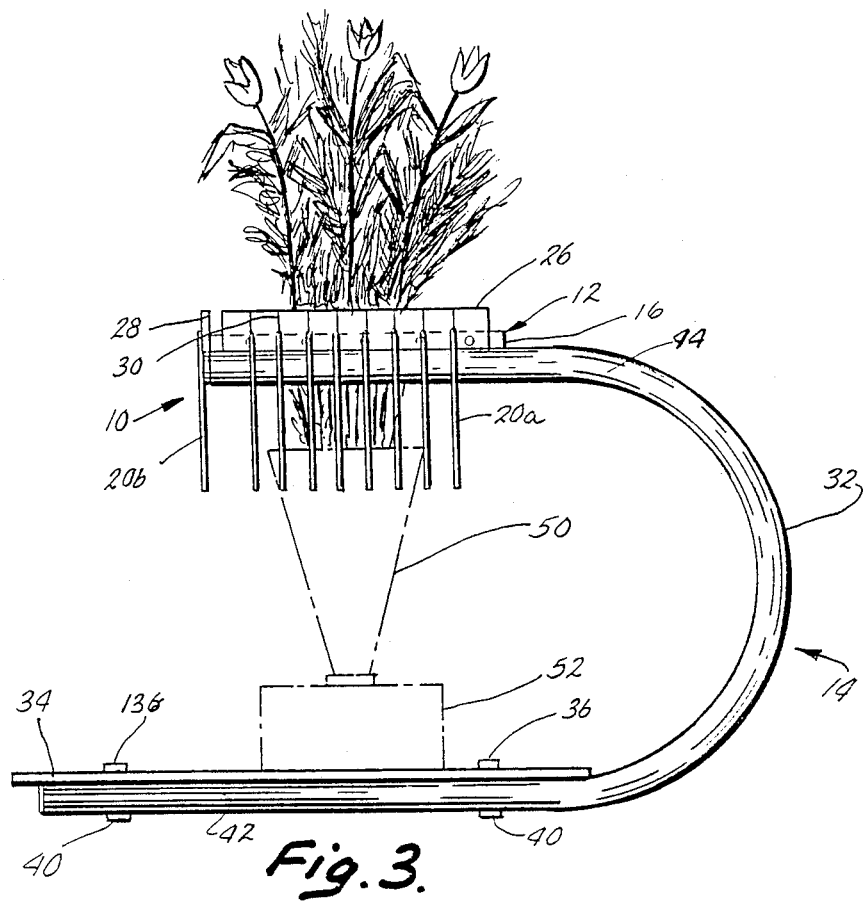
FIG. 3 is a side elevational view taken along the lines III—III in FIG. 2.
Figure 2:
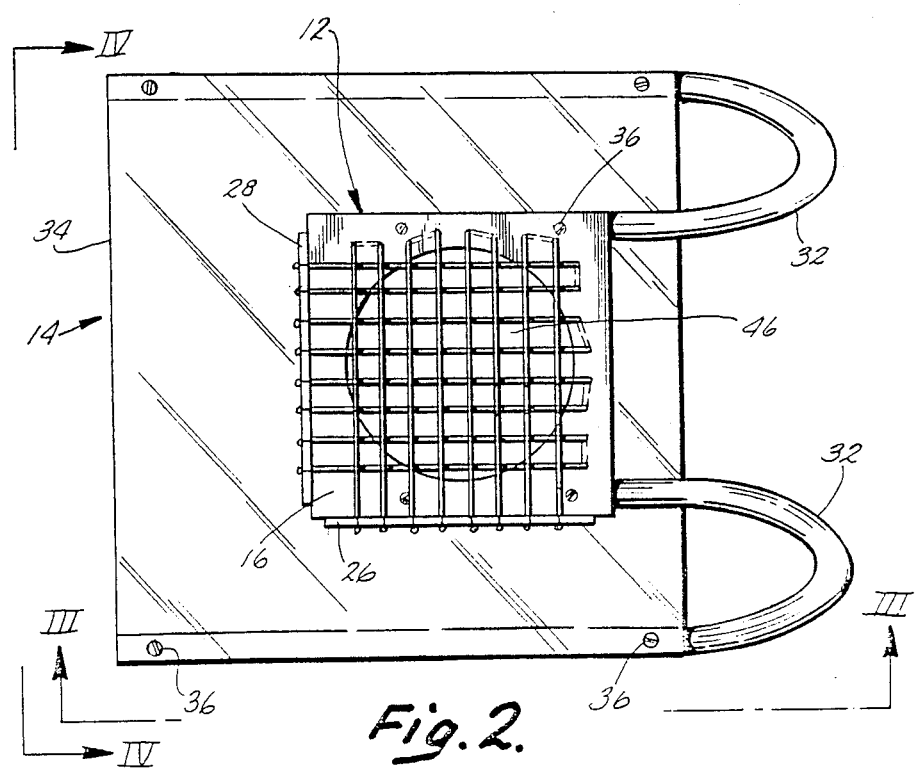
FIG. 2 is a top plan view of the device in FIG. 1.

Referring now specifically to the drawings and the illustrative embodiments depicted therein, a bouquet assembly device, generally shown at 10, includes a work holder 12, which is supported above a horizontal surface, such as a tabletop (not shown), by support means generally shown at 14.

Workholder 12 includes a generally planar platform 16 having a through aperture 18 located centrally therein. A plurality of flexible lines 20a and 20b are tensioned across aperture 18 in an orthogonal grid pattern. Means are provided to secure a middle portion of each line 20a, which extends back and forth across aperture 18, including a first set of openings 22, which are aligned and spaced apart adjacent one portion of aperture 18. Means are provided to secure a middle portion of each line 20b, including a second set of openings 24, which are aligned and spaced apart along a second portion adjacent aperture 18. The openings 24 are aligned perpendicular to the alignment of openings 22.

A gripping block, shown at 26, is positioned on platform 16 opposite openings 22. Gripping block 26 provides gripping means for gripping the ends of lines 20a which extend from openings 22 across aperture 18. A second gripping block 28 is mounted on platform 16 opposite openings 24. Gripping block 28 provides gripping means for gripping the ends of lines 20b extending from openings 24 across aperture 18. Each gripping block 26 and 28 is made from resilient industrial rubber and contains a plurality of parallel slits 30 extending partially through the top-to-bottom dimension of the block (FIGS. 3 and 4). The two ends of each string 20a extend through adjacent openings 22 from the direction opposite that shown in FIG. 5 and traverse aperture 18 in parallel across the top face of platform 16 with the terminal ends thereof received in adjacent slits 30 in gripping block 26. The string ends are inserted in gripping block 26 by positioning the respective end over a slit 30 and pulling downwardly while keeping the string end under tension. Once the string is pulled taut, the tension thereon will be retained by the gripping block 26. Similarly, the two ends of each string 20b extend from the underneath of platform 16 through an adjacent pair of openings 24 and across the top face of platform 16 over aperture 18. The ends of strings 20b are received in slits 30 in block 28.

In the illustrated embodiment, platform 16 is made from a ⅛" thick polycarbonate plate which is selected because it is impervious to sprays used in assembling bouquets and spray solvents. Additionally, the polycarbonate is available in a transparent sheet which provides visibility through the platform to facilitate manipulation underneath while viewing from above. The lines 20 are standard masonry chalk line made from nylon which provides a rugged, yet flexible line. Gripping blocks 26 and 28 are attached to platform 16 by fasteners 29 extending through the gripping blocks and into platform 16.

Support means 14 support platform 16 in a cantilever fashion by a pair of curvilinear support members 32 extending between platform 16 and a base 34. Fasteners 36, extending through platform 16 and base 34 into members 32, retain the components in a rigid assembly. Base 34 is constructed of ¼" polycarbonate plate and tubes 32 of ¼" tubular, galvanized steel coated with polyester powder coat. Plate 34 has a sleeve 38 extending upwardly from an upper surface for a purpose which will be explained in detail below. A plurality of feet 40 are attached on a bottom surface of the portion of support members 32 which extend under platform 34 (FIG. 4). Feet 40 are selected to allow the bouquet assembly device 10 to be readily repositioned on a table without marring the table surface in order to provide flexibility in use. Members 32 are substantially U-shaped and have a first end portion 42 which extend across the front-to-back dimension of base 34 and a second end portion 44 which extend substantially entirely under the front-to-back dimension of platform 16. In this manner, platform 16 is rigidly supported in a cantilever fashion which allows unobstructed access to both the space above and below platform 16.

A bouquet is assembled, using bouquet assembly device 10, by stringing under tension lines 20a from openings 22 to gripping block 26 and lines 20b from openings 24 to gripping block 28. With lines 20 establishing a grid pattern, the designer inserts various pieces of floral greens and flowers between the spaces 46 defined by lines 20a and 20b. The stems of the greens and flowers may extend fully down to base 34 for assembling large bouquets. If such flowers and greens additionally extend a substantial distance above platform 16, an optional dowel 46 may be inserted into cavity 38 to provide stability to the stems of the greens and flowers to reduce their tendency to fall over because of their top-heavy weight distribution (FIG. 4). As the stems and flowers are inserted in spaces 46, between lines 20a and 20b, the greens and flowers are supported in an upright position by the lines. The designer may partially complete a bouquet and return to complete it later. The designer may also experiment by inserting the flowers and greens in one arrangement, then make adjustments as desired.

When the flowers and greens are arranged to the liking of the designer, the stems are gathered and tied with standard floral ties. The terminal ends of strings 20a and 20b are dislodged from gripping blocks 26 and 28 by an upward thrust on the terminal ends of the lines sufficient to dislodge them from slits 30. The lines may then be pulled away from their position between the stems of the greens and flowers. The bouquet is pulled upwardly through aperture 18 and may be further wrapped with florist ties if desired. Because the greens and flowers are retained during assembly in an upright and separated fashion with the tips of the stems against base 34, the stems will gather into a neat, parallel bundle with the tips aligned on a plane perpendicular to the stems. The bouquet will therefore be "balanced" and could support itself freestanding on the tips of the stems. Importantly, this allows the bouquet to be removed from a vase into which it is subsequently inserted for periodic snipping of the tips of the stems to promote water absorption into the live leaves and buds to enhance durability.

As illustrated in FIG. 3, bouquet assembly device 10 may additionally be used to assemble bouquets directly in a vase 50. Vase 50 is illustrated being supported on a block 52 which is resting on base 34. Block 52 is selected to position vase 50 at a desired position with respect to workholder 12. With vase 50 so positioned, the stems of flowers and greens may be positioned through spaces 46 and directly into vase 50. Once the bouquet is complete, lines 20 are dislodged from gripping blocks 26 and 28 and pulled from between the stems of the greens and flowers. Aperture 18 is preselected to be sufficiently large to allow a vase 50 to be pulled upwardly through aperture 18 upon completion of the bouquet assembly. In a preferred embodiment, aperture 18 is 5.75" in diameter and the grid spacing of lines 20a and 20b is 0.75".

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows.

1. A bouquet assembly device comprising:
   a platform and edge means defining a through aperture in said platform;
   a first set of individual lines extending from a first portion of said platform to individual end portions of said first set of individual lines and a second set of individual lines extending from a second portion of said platform to individual end portions of said second set of individual lines, said first and second portions being angularly offset 90° from each other around said aperture;
   first retaining means positioned across said aperture from said first portion for individually releasably retaining the end portion of each individual one of said first set of individual lines and second retaining means positioned across said aperture from said second portion for individually releasably retaining the end portion of each individual one of said second set of individual lines in a manner that said first and second sets of lines are in tension across said aperture and wherein said first set of lines traverse said second set of lines in a grid pattern; and
   support means for supporting said platform above a horizontal surface, whereby a bouquet can be assembled with greens and flowers supported in said aperture between the lines and the lines can be readily removed from the device and from the bouquet after assembly.

2. The device in claim 1 in which said support means comprises means for providing cantilever support to said platform.

3. The device in claim 2 in which said means for providing cantilever support includes a base and a pair of support members extending between said base and said platform.

4. The device in claim 3 in which said base is a planar member parallel said platform.

5. The device in claim 3 in which each of said support members is curvilinear and has a first end portion attached to said base and a second end portion attached to said platform.

6. The device in claim 1 in which said platform is substantially transparent.

7. A bouquet assembly device comprising:

a platform and edge means defining a through aperture in said platform;

retaining means for releasably retaining adjacent end portions of a first set of lines and adjacent end portions of a second set of lines in a manner that said first and second sets of lines are in tension across said aperture and wherein said first set of lines traverse said second set of lines in a grid pattern, and support means for supporting said platform above a horizontal surface, whereby a bouquet can be assembled with greens and flowers supported in said aperture between the lines and the lines can be readily removed from the device and from the bouquet after assembly;

said support means comprising means for providing cantilever support to said platform including a base and a pair of support members extending between said base and said platform, wherein said base is a planar member parallel said platform and each of said support members is curvilinear and has a first end portion attached to said base and a second end portion attached to said platform and wherein each said first end portion extends substantially across and under said base and is configured for engaging a horizontal surface and each said second end portion extends substantially across and under said platform.

8. A bouquet assembly device comprising:

a platform and edge means defining a through aperture in said platform;

retaining means for releasably retaining adjacent end portions of a first set of lines and adjacent end portions of a second set of lines in a manner that said first and second sets of lines are in tension across said aperture and wherein said first set of lines traverse said second set of lines in a grid pattern, said retaining means including a first set of spaced openings in one portion of said platform adjacent said aperture and gripping means across said aperture from said one portion for releasably gripping said end portions of one said set of lines having middle portions extending through said openings, said retaining means further including a second set of spaced openings in another portion of said platform adjacent said aperture and another gripping means across said aperture from said another portion for releasably gripping said end portions of the other said set of lines having middle portions extending through said second set of openings, said second set of openings being displaced approximately 90° from said first set with respect to the center of said aperture, each said gripping means comprising a block of resilient material mounted to said platform and having means defining a plurality of slits therein generally aligned with the respective said openings; and support means for supporting said platform above a horizontal surface, whereby a bouquet can be assembled with greens and flowers supported in said aperture between the lines and the lines can be readily removed from the device and from the bouquet after assembly.

9. A bouquet assembly device comprising:

a generally planar platform having edge means defining a through aperture therein, means defining a first set of generally aligned spaced apart openings through said platform adjacent said aperture, means defining a second set of generally aligned spaced apart openings through said platform adjacent said aperture, said second openings aligned perpendicularly to said first openings;

first retention means mounted to said platform across said aperture from said first openings for releasably retaining adjacent end portions of lines extending through said first openings and across said aperture;

second retention means mounted to said platform across said aperture from said second openings for releasably retaining adjacent end portions of lines extending through said second openings and across said aperture;

a generally planar base member; and cantilever support means extending between first corresponding end portions of said platform and said base member, such that unobstructed access is provided to the area under said platform from a direction facing second corresponding end portions of said platform and base member that are opposite said first corresponding end portions, said support means including a pair of curvilinear tubular members having first end portions attached to said base and second end portions attached to said platform, said first end portions extend substantially across said base and said second end portions extend substantially across said platform.

10. A bouquet assembly device comprising:

a generally planar platform having edge means defining a through aperture therein, means defining a first set of generally aligned spaced apart openings through said platform adjacent said aperture, means defining a second set of generally aligned spaced apart openings through said platform adjacent said aperture, said second openings aligned perpendicularly to said first openings;

first retention means mounted to said platform across said aperture from said first openings for releasably retaining adjacent end portions of lines extending through said first openings and across said aperture;

second retention means mounted to said platform across said aperture from said second openings for releasably retaining adjacent end portions of lines extending through said second openings and across said aperture;

a first set of lines extending through said first openings and a second set of lines extending through said second openings such that said first and second lines will form an orthogonal grid with end portions of said first lines gripped by said first gripping means and end portions of said second lines gripped by said second gripping means;

a generally planar base member; and cantilever support means extending between first corresponding end portions of said platform and said base member, such that unobstructed access is provided to the area under said platform from a direction facing second corresponding end portions of said platform and base member that are opposite said first corresponding end portions.

11. The device in claim 10 in which each said retention means comprises a block of resilient material having means defining a plurality of parallel slits therein for releasably retaining said line end portions.

12. The device in claim 11 in which said platform is substantially transparent.

13. A bouquet assembly device comprising:

a platform and edge means defining a through aperture in said platform;

retaining means for releasably retaining adjacent end portions of a first set of lines and adjacent end portions of a second set of lines in a manner that said first and second sets of lines are in tension across said aperture and wherein said first set of lines traverse said second set of lines in a grid pattern, said retaining means including a first set of spaced openings in one portion of said platform adjacent said aperture and gripping means across said aperture from said one portion for releasably gripping said end portions of one said set of lines having middle portions extending through said openings, said gripping means comprising a block of resilient material mounted to said platform and having means defining a plurality of slits therein generally aligned with said openings; and support means for supporting said platform above a horizontal surface, whereby a bouquet can be assembled with greens and flowers supported in said aperture between the lines and the lines can be readily removed from the device and from the bouquet after assembly.

* * * * *